(12) United States Patent
Bradbury et al.

(10) Patent No.: US 9,836,405 B2
(45) Date of Patent: Dec. 5, 2017

(54) DYNAMIC MANAGEMENT OF VIRTUAL MEMORY BLOCKS EXEMPTED FROM CACHE MEMORY ACCESS

(71) Applicant: INTERNATIONAL BUSINESS MACHINES CORPORATION, Armonk, NY (US)

(72) Inventors: Jonathan D. Bradbury, Poughkeepsie, NY (US); Dan F. Greiner, San Jose, CA (US); Michael Karl Gschwind, Chappaqua, NY (US); Christian Jacobi, Poughkeepsie, NY (US); Younes Manton, Toronto (CA); Anthony Saporito, Highland, NY (US); Chung-Lung Kevin Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/010,658

(22) Filed: Jan. 29, 2016

(65) Prior Publication Data

US 2017/0220475 A1    Aug. 3, 2017

(51) Int. Cl.
*G06F 12/00* (2006.01)
*G06F 12/0888* (2016.01)

(52) U.S. Cl.
CPC .. *G06F 12/0888* (2013.01); *G06F 2212/1044* (2013.01); *G06F 2212/152* (2013.01)

(58) Field of Classification Search
CPC ......... G06F 12/0888; G06F 2212/1044; G06F 2212/152
See application file for complete search history.

(56) References Cited

U.S. PATENT DOCUMENTS

| 8,707,011 | B1 * | 4/2014 | Glasco ............... G06F 12/1027 711/118 |
| 2004/0107318 | A1 * | 6/2004 | Bono ................. G06F 12/0866 711/118 |
| 2014/0173216 | A1 * | 6/2014 | Jayasena ............. G06F 12/0891 711/135 |

OTHER PUBLICATIONS

Jonathan D. Bradbury, et al., "Dynamic Cache Memory Management With Cache Pollution Avoidance", U.S. Appl. No. 15/010,645, filed Jan. 29, 2016.

(Continued)

*Primary Examiner* — Gurtej Bansal
(74) *Attorney, Agent, or Firm* — Cantor Colburn LLP; Steven Chiu

(57) ABSTRACT

A computer-implemented method for identification of cache memory transiency may include identifying, with a processor, a virtual memory address section having a virtual memory address, determining, via the processor, a classification of cache memory transiency of the virtual memory address section, and determining, with the processor, based on the classification of cache memory transiency, a cache exemption status.

13 Claims, 15 Drawing Sheets

(56) References Cited

OTHER PUBLICATIONS

Jonathan D. Bradbury, et al., "Dynamic Cache Memory Management With Translation Lookaside Buffer Protection", U.S. Appl. No. 15/010,691, filed Jan. 29, 2016.

Jonathan D. Bradbury, et al., "Dynamic Management of a Processor State With Transient Cache Memory", U.S. Appl. No. 15/010,686, filed Jan. 29, 2016.

Jonathan D. Bradbury, et al., "Dynamic Management of Memory Ranges Exempted From Cache Memory Access", U.S. Appl. No. 15/010,700, filed Jan. 29, 2016.

List of IBM Patents or Patent Applications Treated as Related; (Appendix P), Date Filed: Mar. 31, 2016, 2 pages.

* cited by examiner

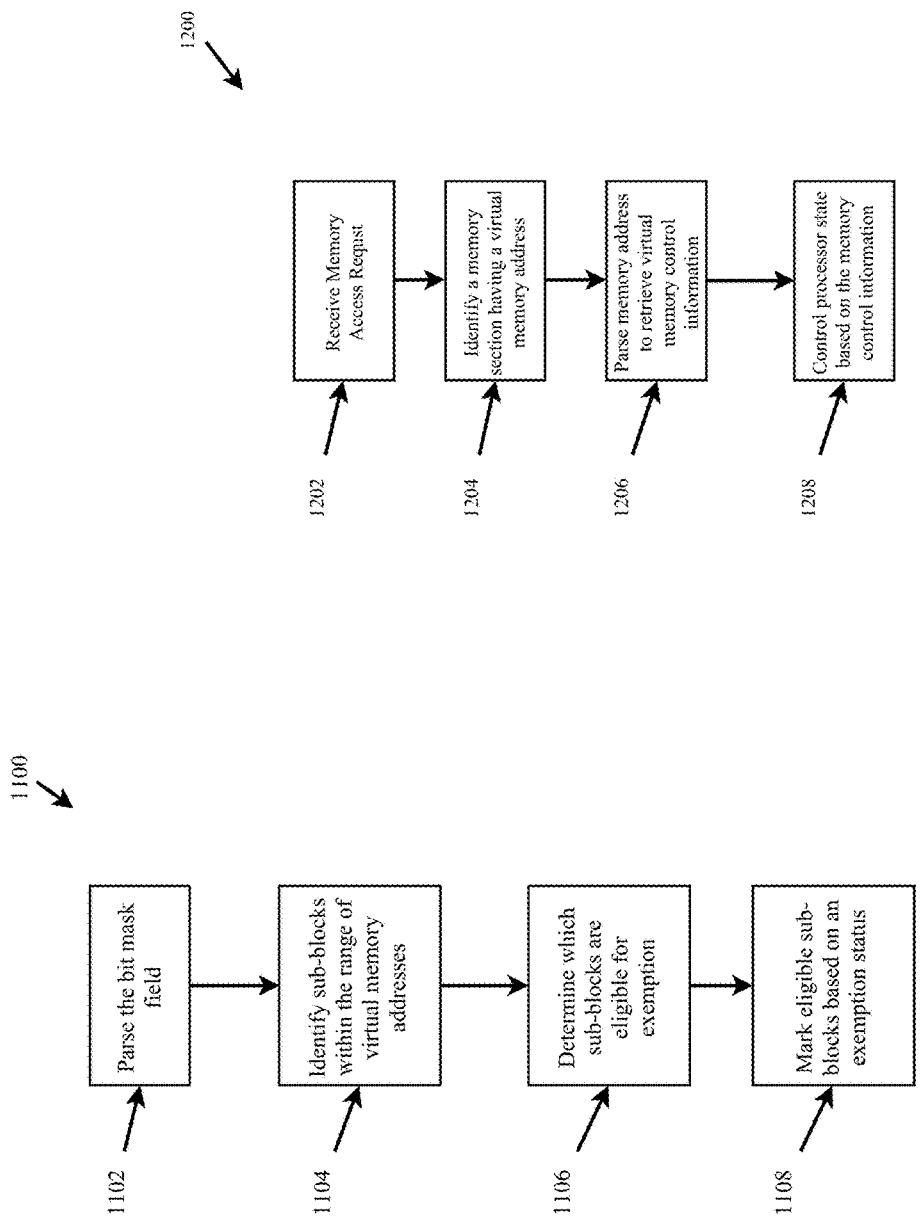

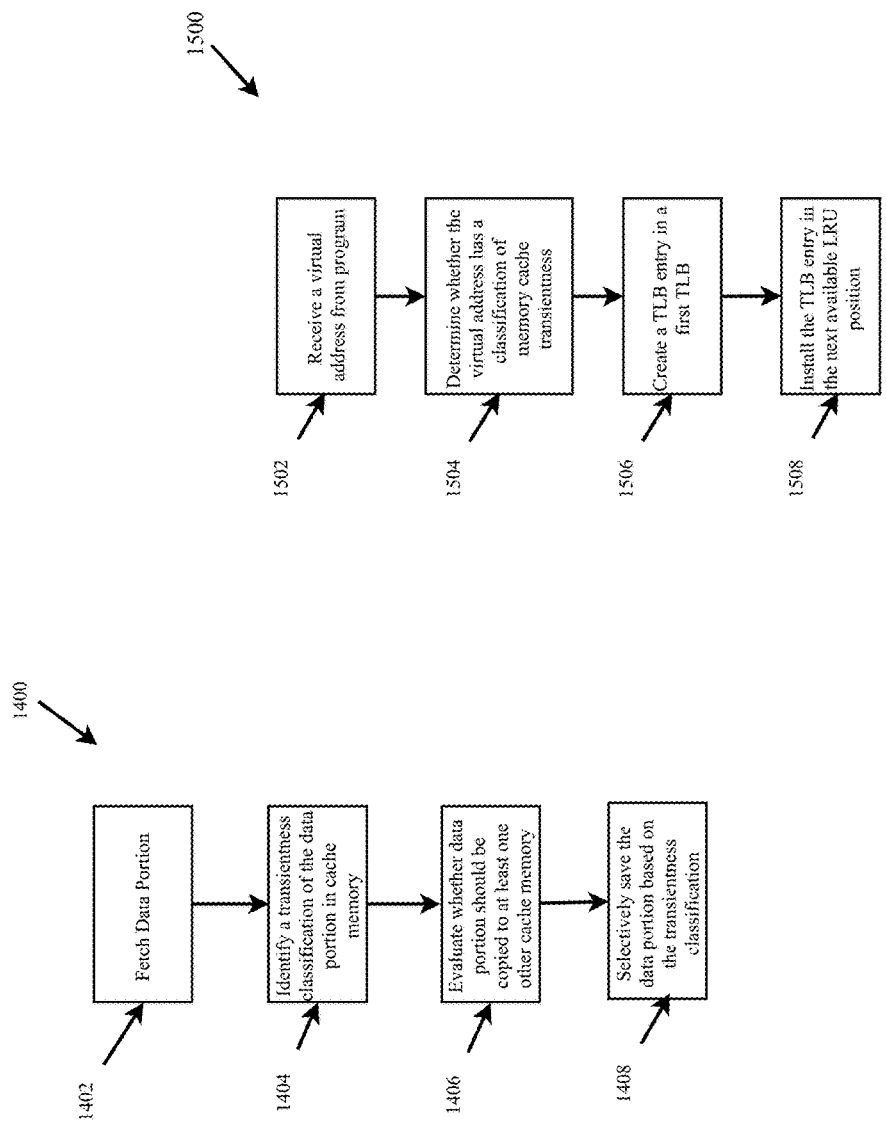

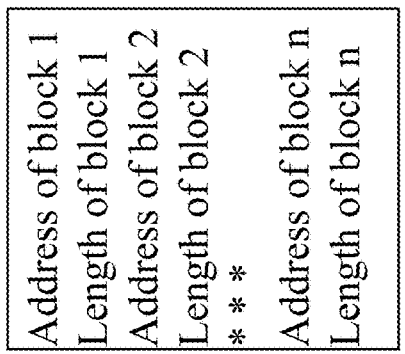
FIG. 18B
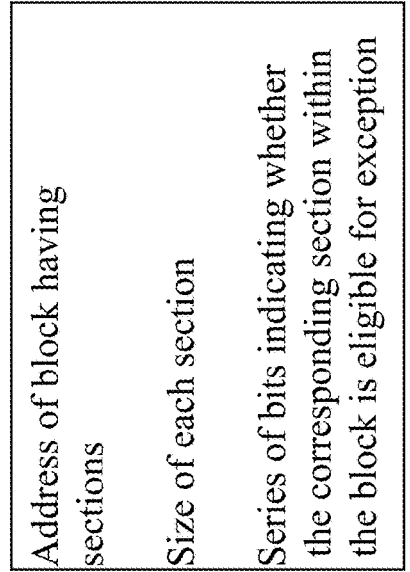
FIG. 18D
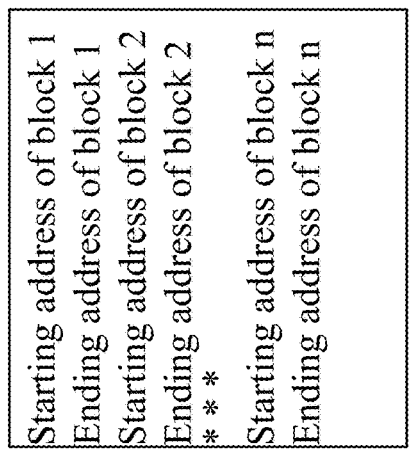
FIG. 18A
FIG. 18C

DYNAMIC MANAGEMENT OF VIRTUAL MEMORY BLOCKS EXEMPTED FROM CACHE MEMORY ACCESS

BACKGROUND

The present disclosure relates to management of virtual memory, and more specifically, to dynamic management of virtual memory blocks exempted from cache memory access.

Although the speed of processor cores has increased (somewhat paralleling the increased chip density predicted by Moore's law), the speed with which processor memory can be accessed has not increased proportionally. To mitigate the slower access speeds to memory, modern processors have included multiple levels of high-speed caches that can provide data access to a smaller subset of the memory at speeds that are closer to that of the core processor. In some implementations, each level of cache represents a minority subset of the higher-level cache memory that is closer to the real memory. Thus having trivial or useless data brought into one or more cache levels can remove more useful data. Such cache "pollution" may "pollute" the cache and can slow the overall processing speed.

To ameliorate older programming technologies, modern programming languages have hidden many of the details of memory management. Although this has resulted in fewer instances of so-called memory leaks and erroneous or malicious memory accesses, and it may have increased programmer productivity, it has placed an additional burden on the compiler or interpreter that implements the language—that of cleaning up after the wayward program. This garbage collection process is periodically utilized in conventional computing systems to free up stale blocks of memory that are no longer accessed by an application program, and potentially defragment the freed blocks into larger contiguous blocks.

Because much of the memory being manipulated during a garbage-collection process represents locations that are no longer in use by a program, and because a large volume of memory locations may be accessed, bringing these locations into CPU caches may pollute the cache with useless data. This may result in the purging of data that could be more useful to keep in the cache, but is being purged simply because it is not accessed during the surge of other garbage-collection accesses. For example, least-recently-used (LRU) algorithms may be used to purge data that is meaningful, even though it does not appear to have been accessed recently due to the glut of garbage-collection references. Current memory management schemes may not determine a "transiency" status of memory locations, which determines when non-transient accesses are to be performed, nor do they capitalize on the transient nature of some memory locations.

SUMMARY

According to some embodiments, a computer-implemented method for identification of cache memory transiency is described. The method may include identifying, with a processor, a virtual memory address section having a virtual memory address, determining, via the processor, a classification of cache memory transiency of the virtual memory address section, and determining, with the processor, based on the classification of cache memory transiency, a cache exemption status.

According to other embodiments, a system for identification of cache memory transiency is described. The system may include processor having access to the cache memory. The processor may be configured to identify a virtual memory address section of the cache memory having a virtual memory address, determine a classification of cache memory transiency of the virtual memory address section, and determine, based on the classification of cache memory transiency, a cache exemption status.

According to yet other embodiments, a non-transitory computer-readable storage medium is described. The non-transitory storage medium may include program instructions that are executable by a processor to perform a method for identification of cache memory transiency. The method may include identifying, with a processor, a virtual memory address section having a virtual memory address, determining, via the processor, a classification of cache memory transiency of the virtual memory address section, and determining, with the processor, based on the classification of cache memory transiency, a cache exemption status.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 11 depicts a flow diagram of a computer-implemented method for defining a transient-access memory range with a bit mask control in accordance with an exemplary embodiment;

FIG. 12 depicts a flow diagram for a computer-implemented method for managing a processor state with transient cache memory in accordance with some embodiments;

FIG. 14 depicts a flow diagram for a computer-implemented method for managing a cache memory using transiency classification in accordance with some embodiments;

FIG. 15 depicts a flow diagram for a computer-implemented method for protecting a translation lookaside buffer is depicted in accordance with some embodiments;

FIG. 18A depicts an exemplary algorithm for defining blocks of memory eligible for cache exemption;

FIG. 18B depicts an exemplary algorithm for defining blocks of memory eligible for cache exemption using address length pairs in accordance with some embodiments;

FIG. 18C depicts an exemplary algorithm for defining blocks of memory using an initial value in accordance with some embodiments; and FIG. 18D depicts an exemplary algorithm for defining blocks of memory eligible for cache exemption with a single address field including a plurality of sections in accordance with some embodiments.

DETAILED DESCRIPTION

Figure 1:
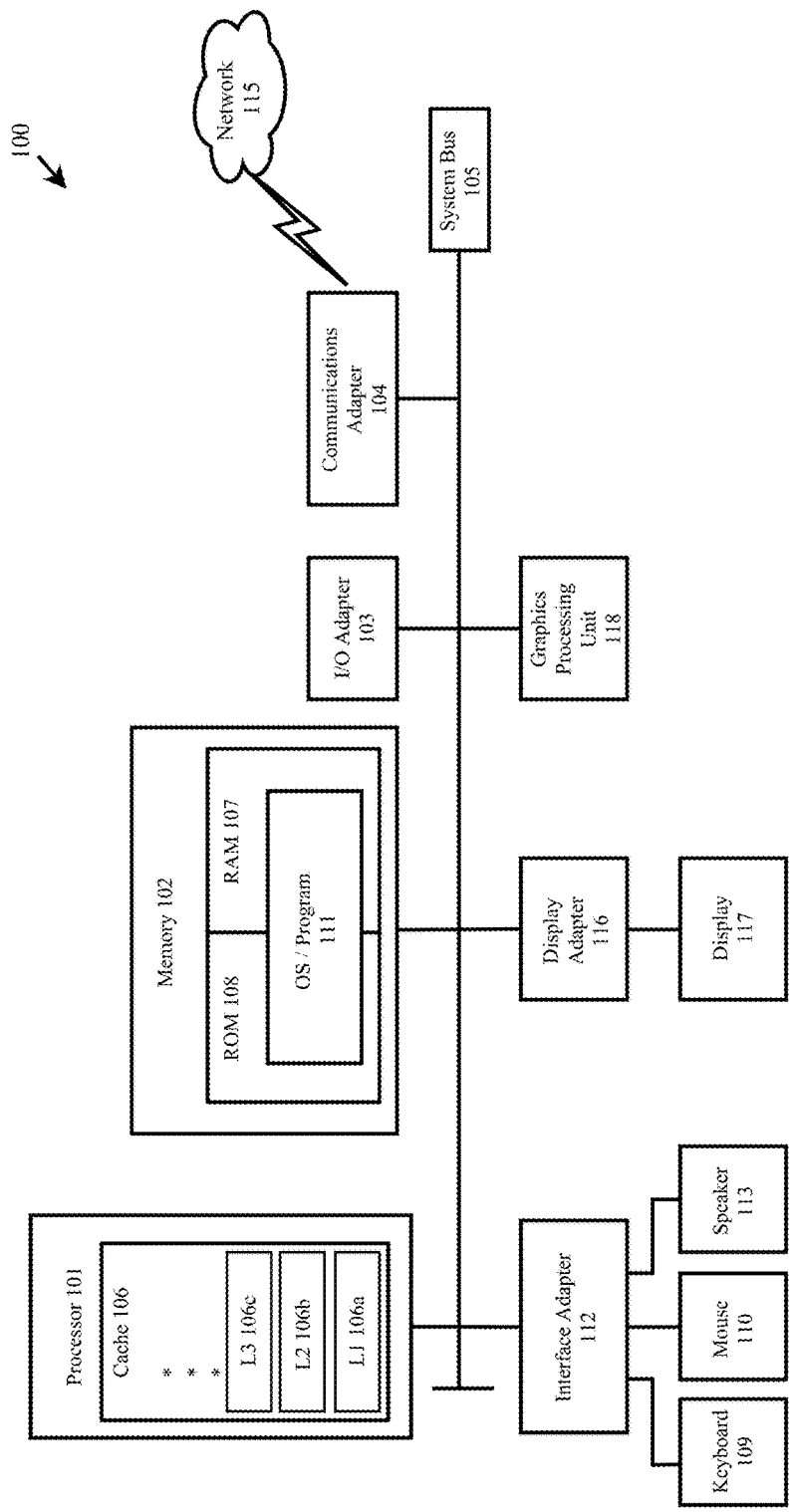
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc. According to some embodiments, methods described herein could also be applicable to various process-control CPUs, such as those used in industrial machinery, medical equipment, or automotive devices.

In an exemplary embodiment, in terms of hardware architecture, as shown in FIG. 1, the computer 100 includes processor 101. Computer 100 also includes memory 102 coupled to processor 101, and one or more input/output adaptors 103 that may be communicatively coupled via system bus 105. Memory 102 may be operatively coupled to one or more internal or external memory devices. Communications adaptor 104 may be operatively connect computer 100 to one or more networks 115. A system bus 105 may also connect one or more user interfaces via interface adaptor 112. Interface adaptor 112 may connect a plurality of user interfaces to computer 100 including, for example, keyboard 109, mouse 110, speaker 113, etc. System bus 105 may also connect display adaptor 116 and display 117 to processor 101. Processor 101 may also be operatively connected to graphical processing unit 118.

Figure 16:
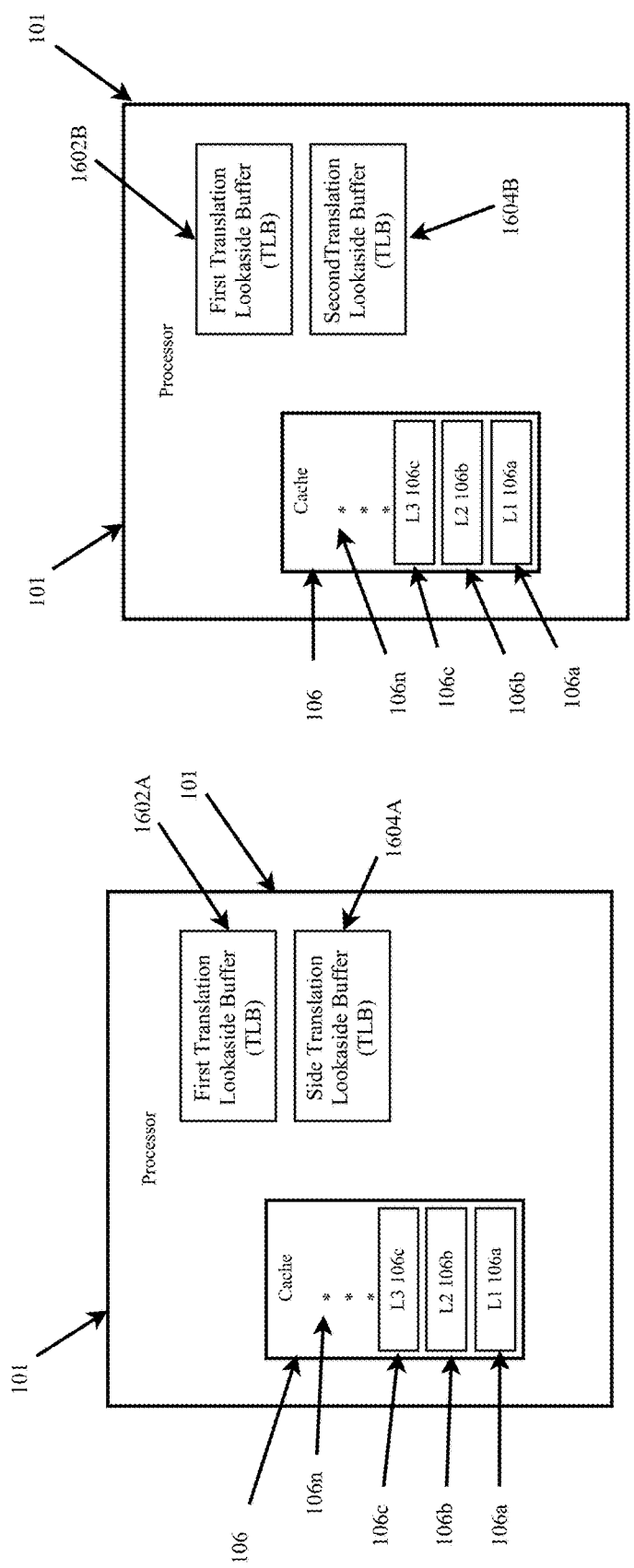
FIG. 16A depicts an exemplary processor in accordance with some embodiments.
FIG. 16B depicts an exemplary processor in accordance with some embodiments.

Processor 101 is a hardware device for executing hardware instructions or software, particularly that stored in a non-transitory computer-readable memory (e.g., memory 102). Processor 101 can be any custom made or commercially available processor, a central processing unit (CPU) (e.g., processor 101), a plurality of CPUs, an auxiliary processor among several other processors associated with the computer 100, a semiconductor based microprocessor (in the form of a microchip or chip set), or generally any device for executing instructions. Processor 101 can include a cache memory 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache 106 may be organized as a hierarchy of more cache levels (L1, L2, etc.). For example, cache 106 may include an L1 cache 106a, an L2 cache 106b, an L3 cache 106c, etc. It is contemplated that cache 106 may include more levels including 106n level caches (shown with respect to FIG. 16).

The instructions in memory 102 may include one or more separate programs, each of which comprises an ordered listing of computer-executable instructions for implementing logical functions. In the example of FIG. 1, the instructions in memory 102 may include an operating system 111. Operating system 111 can control the execution of other computer programs and provides scheduling, input-output control, file and data management, memory management, and communication control and related services.

Input/output adaptor 103 can be, for example but not limited to, one or more buses or other wired or wireless connections, as is known in the art. Input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more input/output (I/O) devices to computer 100. For example, interface adaptor 112 may connect a keyboard 109 and mouse 110. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 115.

Network 115 can be an IP-based network for communication between computer 100 and any external device. Network 115 transmits and receives data between computer 100 and devices and/or systems external to computer 100. In an exemplary embodiment, network 115 can be a managed IP network administered by a service provider. Network 115 may be a network internal to an aircraft, such as, for example, an avionics network, etc. Network 115 may be implemented in a wireless fashion, e.g., using wireless protocols and technologies, such as WiFi, WiMax, etc. Network 115 may also be a wired network, e.g., an Ethernet network, an ARINC 429 network, a CAN, etc., having any wired connectivity including, e.g., an RS232 connection, R5422 connection, etc. Network 115 can also be a packet-switched network such as a local area network, wide area network, metropolitan area network, Internet network, or other similar type of network environment. The network 115 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Figure 2:
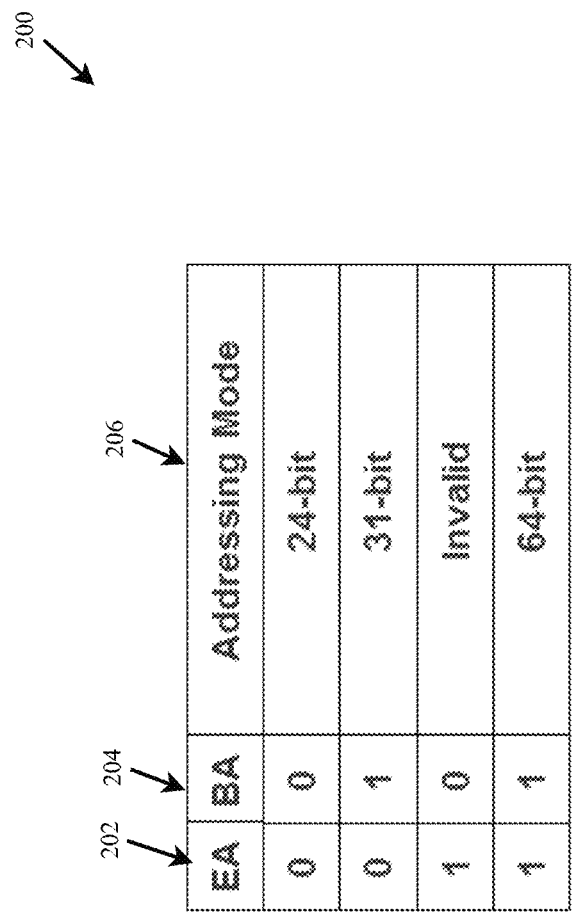
FIG. 2 depicts a table of addressing-control bits with respective addressing modes in accordance with an exemplary embodiment.

As previously discussed, the speed with which processor memory can be accessed has not increased proportionally. To mitigate the slower access speeds to memory, some processors have included multiple levels of high-speed caches that can provide data access to a smaller subset of the memory at speeds that are closer to that of the core processor. For example cache 106 as depicted in FIG. 1 may include L1 cache 106a, which may be closest to (real) memory 102. L1 cache 106a may be a subset of L2 cache 106b, having all of the information stored in 106a, plus additional information. L3 cache 106c may be a subset of L2 cache 106b, etc. Because each level of cache may represent a minority subset of the higher-level cache memory that is closer to the real memory 102, having trivial or useless data pollute the lowest level cache 106a can slow the overall processing speed. Accordingly, it may be advantageous to identify blocks of memory that are to be exempted from cache accesses in any cached memory environment. FIG. 2 depicts a table 200 showing enhanced addressing (EA) and basic-addressing (BA) control bits 202 and 204 with respective addressing modes 206, according to some embodiments.

In some aspects, a program status word (PSW) can designate 24-bit, 31-bit, or 64-bit address lengths. Virtual address memory systems may use a page table data structure in a computer operating system to store the mapping between virtual addresses and physical addresses.

In some embodiments, processor 101 may add an extended-addressing (EA) control bit 202, which may be configured as a control to bit 31 of the PSW. Processor 101 may also be configured to utilize an address bit 32 of the PSW to function as a basic-addressing (BA) control bit 204. BA control bits 204 and EA control bits 202 may provide combinations of the EA and BA bits (202 and 204, respectively) having a plurality of addressing modes 206. Addressing modes 206 may be configured to correlate to a corresponding address format. Addressing is discussed in detail in the International Business Machines publication SA22-7832-09 titled, "z/Architecture Principles of Operation," Tenth Edition (September, 2012), which is incorporated by reference herein in its entirety.

In IBM mainframe architecture, for example, a virtual address is divided into a segment index (SX), page index (PX), and byte index (BX) in the 24-bit and 31-bit addressing modes. In the 64-bit addressing mode, the virtual address is extended on the left with a region index which may comprise a region-third index (RTX), region-second index (RSX), and region-first index (RFX), depending on the scope of the virtual address.

Each applicable index (except the byte index) may be used as an offset into a corresponding translation table to select either (a) a table entry that points to the next table to be used in the translation, or (b) a table entry that contains the final real (or absolute) memory address that completes the translation. Memory segment tables may identify a memory segment and an offset within that segment. Segments or sections are also used in object files of compiled programs when they are linked together into a program image and when the image is loaded into memory. Segments usually correspond to natural divisions of a program such as individual routines or data tables so segmentation is generally more visible to the programmer than paging alone. In some aspects, processor 101 may create different program modules for different classes of memory usage such as code and data segments. In some embodiments, processor 101 may share certain segments between programs. Segment translation tables may be configured to provide virtual to real mapping of address space.

Figure 3:
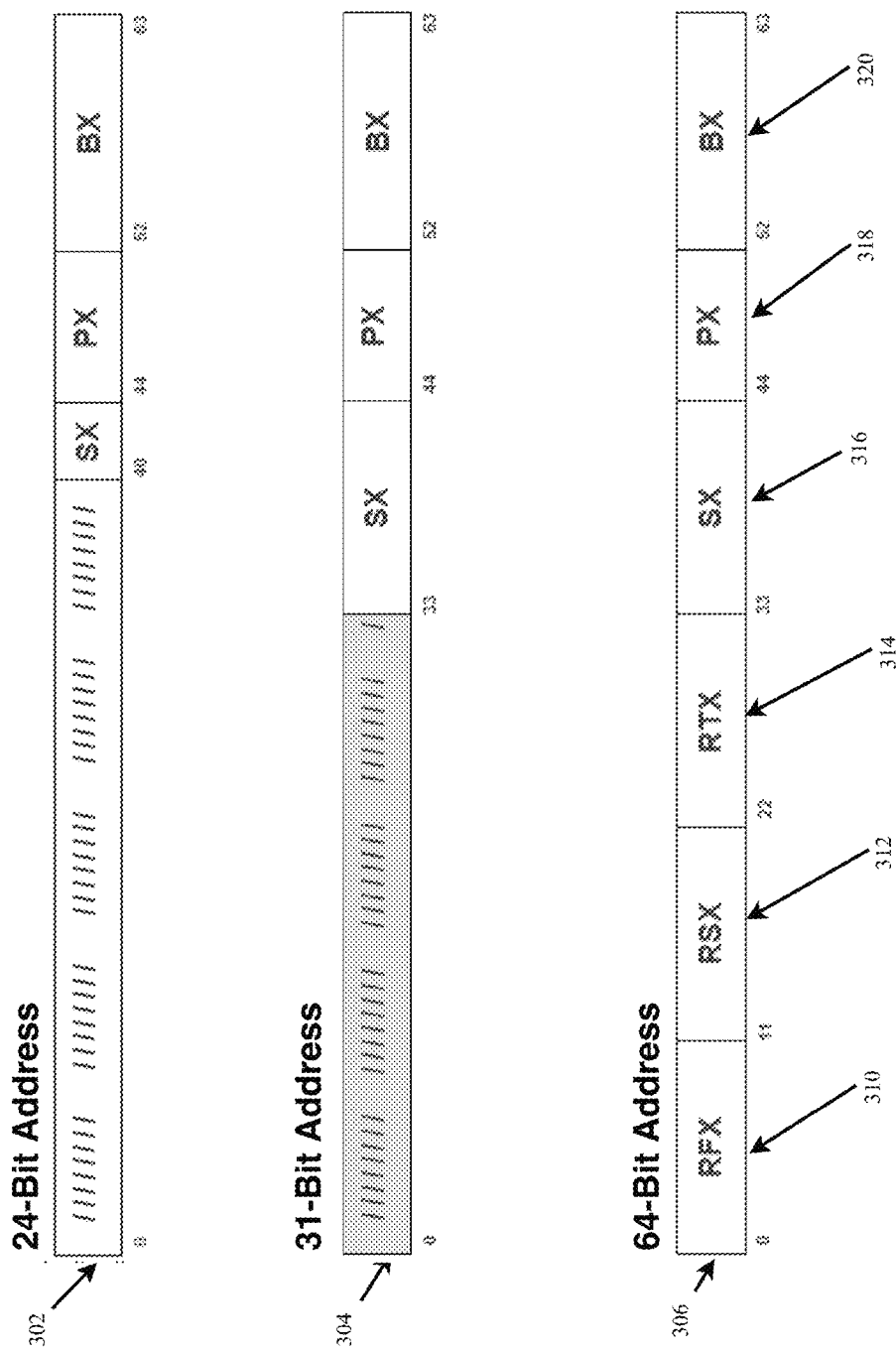
FIG. 3 depicts a plurality of address formats in accordance with an exemplary embodiment.

Referring now to FIG. 3, a plurality of virtual address formats are depicted, according to some embodiments. As previously discussed, a virtual address may be configured to include 24 bits (as shown in 24 bit virtual address 302), 31 bits (as shown in 31-bit virtual address 304), or 64 bits (as shown in 64 bit virtual address 306). In some addressing modes, portions of a larger (e.g., 64-bit) address may be reserved as shown in 302 and 304. Accordingly, the segment index may include only 4 or 11 bits, respectively. When extending the virtual address to 64 bits, the address may now include 33 bits to the left of SX field 316, thus 64 bit virtual address 306 may include three 11-bit region indices. By having each of the region and segment indices be 11 bits, the lookup mechanism used for them, in some instances may be substantially identical. In order to accommodate a 64-bit virtual address 306, more levels of translation tables may be required. For example, in addition to the segment and page tables, up to three levels of region tables may be used to perform the translation.

With respect to 64 bit virtual address 306 in greater detail, 64 bit virtual address 306 may include a plurality of index fields that may include, for example, region-$1^{st}$ index field 310 (depicted as RFX 310), region-$2^{nd}$ index field 312 (RSX field 312), region $3^{rd}$ index field 314 (RTX field 314), segment index 316 (SX field 316), page index 318 (PX field 318), and byte index 320 (BX field 320), however, the byte index is not used to access translation tables).

Figure 4:
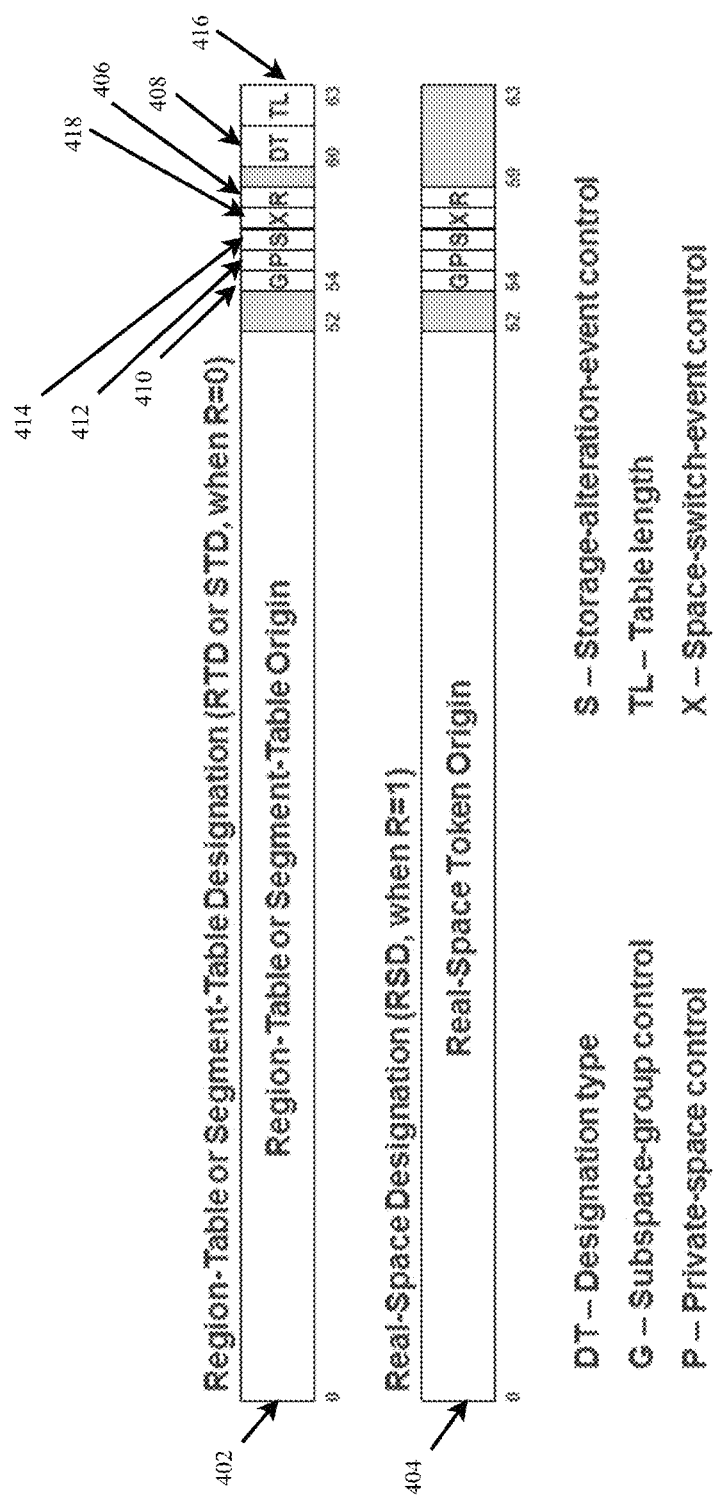
FIG. 4 depicts two examples of address-space-control-element (ASCE) formats in accordance with an exemplary embodiment.

FIG. 4 depicts two examples of address-space-control-element (ASCE) formats, in accordance with some embodiments. Some embodiments may include a segment-table designation (STD), which may be analogous to an ASCE. In some aspects, an ASCE can include an 8-byte field that appears in control registers having the values 1, 7, and 13, and in an ASN-second-table-entry (ASTE, derived from an access-register-translation process) used by processor 101 in the virtual address translation process. According to some embodiments, and unlike some current virtual addressing schemes, an ASCE virtual addressing format may contain a real-space control bit, which may be embodied as an R bit configured in bit 58. The value of R bit 406 may determine one of two addressing formats depicted in FIG. 4. Referring now to FIG. 4, in some embodiments, when processor 101 sets R 406 bit to one, as shown in ASCE 404, there may be a one-to-one virtual-to-real correspondence for the address space. In this case, bits 0-51 of ASCE 404 may contain a token that is used in the TLB. When the R bit is zero, as shown in ASCE 402, ASCE 402 points to a table for processor 101 to perform the virtual address translation. The designation-type 408 (DT) field in bits 60-61 may indicate the type of table: region-first, region-second, region-third, or segment. In some aspects, an ASCE may also include other bit controls, a subspace-group control (G) 410, a private-space control (P) 412, a storage-alteration-event control (S) 414, a table length control (TL) 416, and a space-switch-event control (X) 418.

Figure 5:
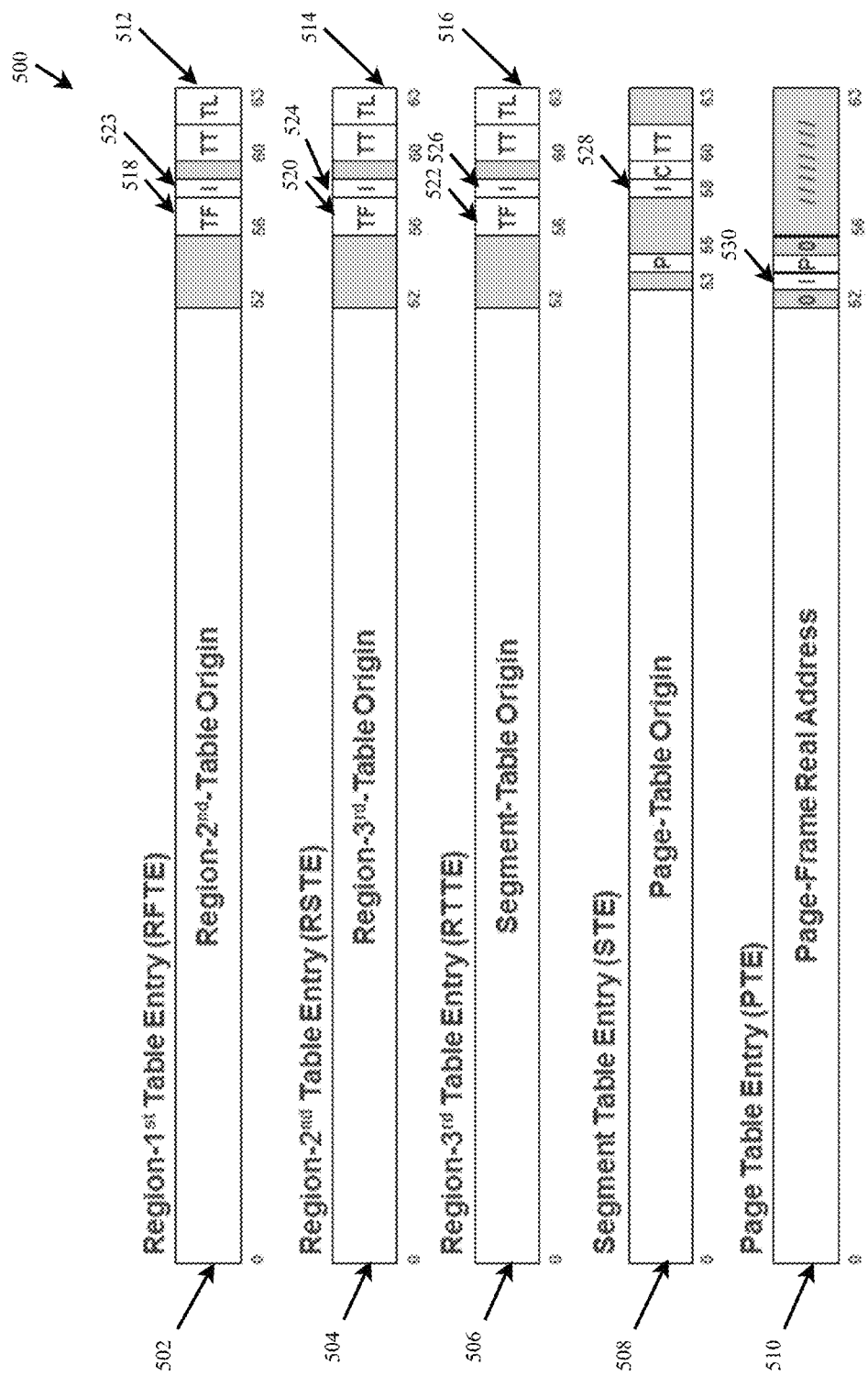
FIG. 5 depicts block diagrams of a plurality of region tables in accordance with an exemplary embodiment.

According to some embodiments, in order to accommodate a 64-bit virtual address 306, processor 101 may access five levels of translation tables. For example, in addition to the segment and page tables, three levels of region tables may be used to perform the translation. FIG. 5 depicts block diagrams of a plurality of translation tables 500 having various table formats, in accordance with some embodiments.

Referring now to FIG. 5, a plurality of translation tables 500 may include five levels of table entries. Each ASCE (e.g., ASCE 402), and each level of region-table entry (depicted as table entries 502, 504, and 506) may contain a 2-bit table length (TL) field (TL fields 512, 514, and 516, respectively) designating the size of the lower-level table designated by the entry (in units of 4 K-byte blocks). For example, depending on the designation type, TL field 512 in a region-first-table entry designates the length of the region-second table, TL field 514 in the region-second-table entry designates the length of the region-third table, and TL field 516 in the region-third-table entry designates the length of the segment table.

According to some embodiments, since page tables are fixed in size, the segment-table entry may not contain a length indication of the page table that it designates. As the page-table entry is the last-possible entry in the translation, there is no length of a subsequent table.

A table entry that designates a lower-level table is commonly referred to as a "branch" table entry, whereas, a table entry that represents the final entry in the translation is commonly called a "leaf" table entry. With the enhanced-DAT facility 1 (EDAT-1) a control in a segment table entry can indicate that it is the leaf entry, in which case there is no table-length field in the entry. Similarly, with the enhanced-DAT facility 2, a control in a region-third table entry can indicate that it is a leaf-table entry, in which case there is no table-length field in the entry.

Figure 6:
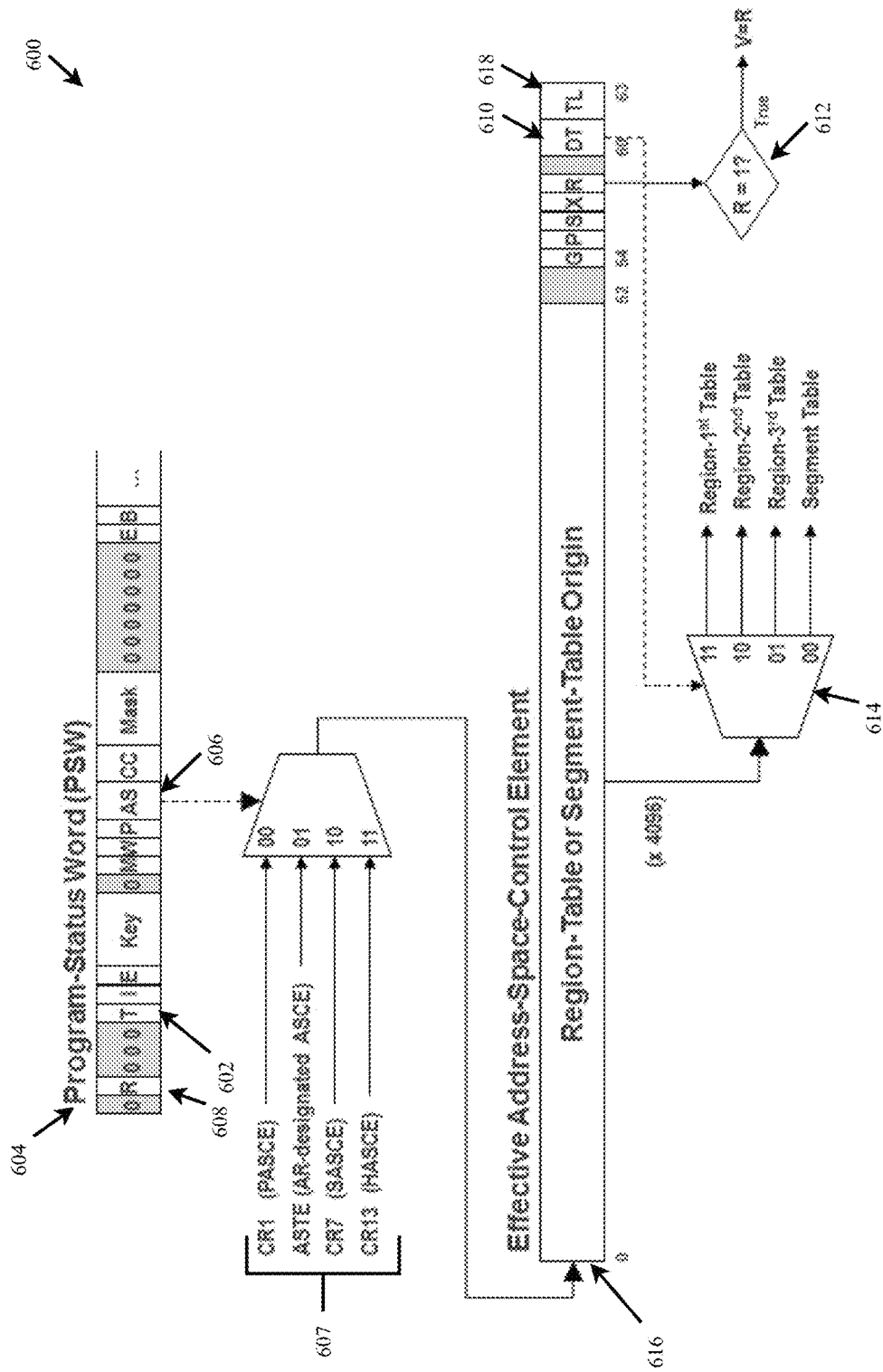
FIG. 6 depicts a flow diagram illustrating the selection of an effective address-space-control element, based on the current address-space control in the program-status word (PSW)

The region-table entries may also contain a 2-bit table offset (TF) field, shown in FIG. 5 as TF fields 518, 520, and 522. TF fields 518, 520, and 522 may indicate, in units of 4 K-byte blocks, the respective portions of the designated table that can be assumed to be missing and invalid. For example, if TF field 522 of region-third table entry 506 contains 01 hex, the bits may indicate that the first 4 K-byte block (512 entries) of the designated segment table may always be assumed to be invalid. More succinctly, if the first two bits of the index field in a virtual address are less than the respective TF field in the designating table entry, then a region $2^{nd}$ 504, region $3^{rd}$ 506, or segment-translation table 508 exception is recognized, depending on which index is being used in the translation. FIG. 6 depicts a flow diagram 600 of a virtual address translation, in accordance with some embodiments.

Referring now to FIG. 6, processor 101 may begin an exemplary virtual address translation by examining the translation (T) bit 602, shown in FIG. 6 as bit 5 of the a current program status word (PSW) 604. In some aspects, if T bit 602 is zero, then processor 101 may treat the address as a real memory address. If the T bit 602 is one, then processor 101 may continue translating the virtual address as further described.

In some embodiments, processor 101 may use address-space (AS) control 606, bits 16 and 17 of PSW 604, to determine which address-space control element 616 (ASCE) to be used in the translation: the primary ASCE (PASCE) in control register 1, the access-register-designated (AR-designated) ASCE derived from the address-space-second-table from the access-register-translation process, the secondary ASCE (SASCE) from control register 7, or the home ASCE (HASCE) from control register 13. In some aspects, the source can be one of address space elements 607, based on the two bits depicted in AS control 606.

As shown in block 612, if processor 101 determines that real-space (R) bit 608 of ASCE 616 is one, then there is a one-to-one correspondence between the virtual address "V" and real address "R" indicated by real-space R bit 608, and the virtual address translation is complete. Otherwise, processor 101 may determine the first table to be used in the virtual address translation process, based on a designation-type (DT) field 610. For example, as shown at block 614, DT field 610 may be indicative of one of the region-first table, region-second-table, region-third table, or segment table, the table entries of which 500 are shown with respect to FIG. 5, which processor 101 may use to perform the virtual address translation.

ASCE designation type (DT) field 610 may indicate a table of sufficient scope to map the virtual address. For example, if DT≤2, then the RFX (bits 0-10 of a virtual address) must be zero. If DT≤1, then RFX and RSX (bits 0-21 of a virtual address) must be zero. If DT=0, then the entire RX range (bits 0-32 of the virtual address) must be zero. Otherwise, the ASCE type exception may be relevant.

According to some embodiments, it may be advantageous for processor 101 to check the ASCE type to determine whether the table has sufficient scope to map the virtual address to a real address. In some embodiments, the designation-type field DT field 610 may be configured to specify the number of translation tables that processor 101 must access to perform a virtual address translation. Accordingly, DT field 610 may designate a table of sufficient scope to map the virtual address. If the virtual address is higher than 2 G-bytes (e.g., the region-3rd index is nonzero), then processor 101 may access single region-$3^{rd}$ table entry 506 for the translation. If the virtual address is higher than 4 T-bytes, (e.g., the region-$2^{nd}$ index is nonzero), then processor 101 may access single region-$2^{nd}$ table 504. If the virtual address is higher than 8 P-bytes (e.g., the region-1st index is nonzero), then processor 101 may access single region-$1^{st}$ table 502. If the virtual address exceeds the scope of the translation-tables provided, then processor 101 may recognize an ASCE-type exception (program-interruption code [PIC] 0038 hex). It should be appreciated that, although only a single access single region-$1^{st}$ table 502, single region-$2^{nd}$ table 504, and single region-$3^{rd}$ tables 506 are depicted for simplicity, it should be understood that the entire regions for each respective table are implicitly included in the various embodiments.

Ideally, the number of translation tables used in a translation should be kept to a minimum to limit the number of storage accesses required. However, there is no requirement that region-tables be omitted. Even when mapping a 2 G-byte address space (which may require only segment-table entries to complete the translation), region-$1^{st}$, region-$2^{nd}$, and region-$3^{rd}$ tables may be specified.

For the purpose of this discussion, the term "low-level" cache will refer to a lower-numbered cache, (e.g., closer to or equal to L1 cache 106*a*), and higher level cache may be greater than L1 cache 106*a* (e.g., L2 cache 106*b* or L3 cache 106*c*).

According to other embodiments, it may be advantageous for processor 101 to check the table length to determine a size of the table in K-byte blocks. The ASCE contains a 2-bit table-length (TL) field 618, describing the length of the designated table in units of 4 K-byte blocks. Each of the region-table entries (e.g., table entries 502, 504, and 506) may contains a similar TL field (e.g., TL fields 512, 514, and 516, respectively) describing the length of the table designated by that entry. A generic TL field 618 is depicted with respect to FIG. 6. In some aspects, processor 101 may encode table length field TL 618 such that a value of 0 indicates a 4K table (512 entries). Processor 101 may further encode the length such that a 1 may indicate an 8K table (1,024 entries), a 2 can indicate a 12K table (1,536 entries), and a 3 can indicate a 16K table (2,048 entries).

One purpose of TL field 618 is to allow a particular table to be shorter than its maximum size of 16K (2,048 entries). If the bits 0-1 of the region-$1^{st}$ index (RFX) 310 are greater than the TL field 618 in ASCE 616, then processor 101 may recognize a region-$1^{st}$ translation exception (program-interruption code [PIC] 0039 hex). If bits 0-1 of the region-$2^{nd}$ index (RSX) 312 are greater than TL field 618 describing the region-$2^{nd}$ table, then processor 101 may recognize a region-$2^{nd}$ translation exception (program-interruption code [PIC] 003A hex). If bits 0-1 of the region-$3^{rd}$ index (RTX) 314 are greater than TL field 618 describing the region-$3^{rd}$ table 504, then processor 101 may recognize a region-$3^{rd}$-translation exception (program-interruption code 003B hex). If bits 0-1 of the segment index (SX) 316 are greater than TL field 618 describing the segment table 508, then processor 101 may recognize a segment-translation exception (program-interruption code 0010 hex).

According to some embodiments, it may be advantageous for processor 101 to check the table-offset value in the TL field 618. In addition to TL field 618 limiting the upper bounds of a table, the region-$1^{st}$, region-$2^{nd}$, and region-$3^{rd}$ table entries (502, 504, and 506, respectively) each may contain a table offset (TF) field (518, 520, and 522, respectively). TF fields 518, 520, and 522 may indicate the number of 4 K-byte blocks at the beginning of each respective table that are assumed to be invalid. This can allow processor 101 to provide a partial table that maps only the higher portion of a virtual address.

For example, if bits 0-1 of region-$2^{nd}$ index 312 (RSX) are less than TF field 518 in region-$1^{st}$ table entry 502 (which designates single region $2^{nd}$ table entry 504), then processor 101 may recognize a region-second-translation exception (program-interruption-code 003A hex). If bits 0-1 the region $3^{rd}$ index 314 are less than the TF field 520 in region $2^{nd}$ table entry 504 (which designates region $3^{rd}$ table entry 506), then processor 101 may recognize a region $3^{rd}$ translation exception (program-interruption code 003B hex). If bits 0-1 of segment index 316 are less than the TF field 522 in the region-$3^{rd}$ table entry 506 (which designates the segment-table 508), then processor 101 may recognize a segment-translation exception (program-interruption code 0011 hex).

Processor 101 may also be configured to check the table type to determine whether the table type matches the ASCE designation type. Accordingly, processor 101 may access the various indices in the virtual address to locate table entries in the translation tables—each one except the page-table entry may designate the next table to be used in the translation.

For example, with respect to region-$1^{st}$, region-$2^{nd}$, and region-$3^{rd}$ table entries (502, 504, and 506, respectively), and segment-table 508, the table-type field 614 in table entry must correctly indicate the type of the table. For a table designated by the ASCE, the TT bits in the table entry must match the DT bits 610 in ASCE 616. For a table designated by a higher table entry, the TT in the designated entry (that is lower) must be one less than that of the designating (higher) table entry. If the TT fields do not contain the expected value, then processor 101 may recognize a translation-specification exception (program-interruption code 0012 hex). For the purposes of correct table-type verification, a region-$1^{st}$ table 502 is the highest, and a segment table STE 508 is the lowest. It is contemplated that higher and/or lower level tables may be included.

In some embodiments, processor 101 may also check table entry validity. As the translation process traverses the table entries, the invalid bit (bits 523, 524, 526, 528, and 530) may be checked in each table entry (502, 504, 506, 508, and 510, respectively). If the I bit in each respective table is one, then processor 101 may recognize a translation exception corresponding to that particular table type. For example, in one aspect, processor 101 may recognize a region-$1^{st}$ translation exception if I bit 523 is one in RFT 502. In another aspect, processor 101 may recognize a region $2^{nd}$ translation exception if the I bit 524 is 1 in region table entry 504. In another aspect, processor 101 may recognize a region-$3^{rd}$ translation exception if I bit 526 is 1 in RTTE 506. In yet another aspect, processor 101 may recognize a segment translation exception if the I bit 528 is 1 in STE 508. Lastly, processor 101 may recognize a page-translation exception if I bit 530 is 1 in PTE 510.

Figure 7:
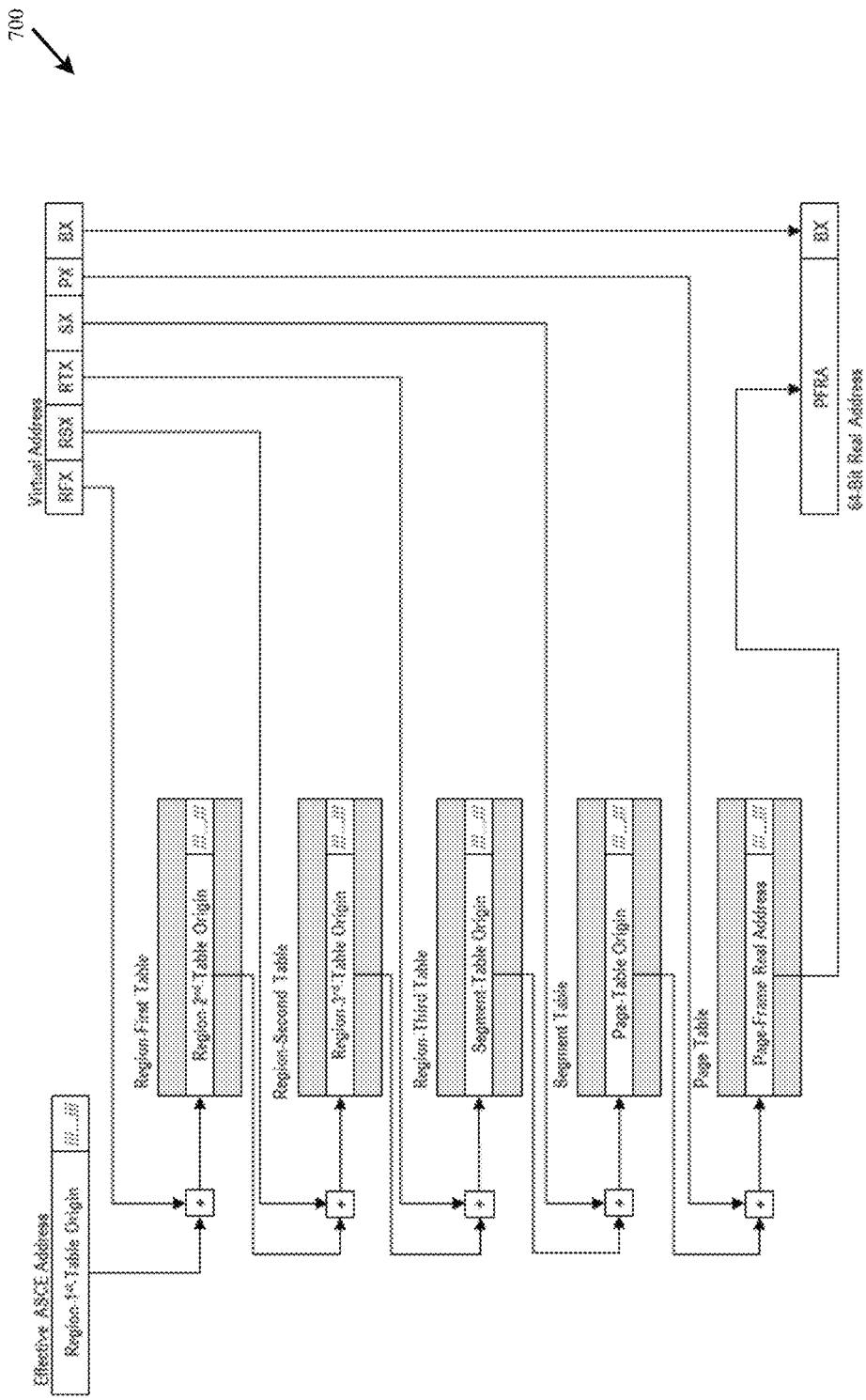
FIG. 7 depicts a flow diagram of a translation of a 64 bit virtual address that uses all five levels of translation tables in accordance with an exemplary embodiment.

Referring now to FIG. 7, a flow diagram 700 is depicted, which shows an exemplary translation of a 64 bit address that uses all five levels of translation tables.

First-level cache memory (e.g., L1 cache 106*a*) can operate similar speed as the main processor (e.g., processor 101). In some aspects, the number of processor cycles required to access higher-numbered caches (that is, those farther from the processor and closer to physical memory) may increase drastically for each higher level. This speed differential may become an issue in larger systems, which may include terabytes of memory. In some aspects, it may take hundreds of cycles for the higher levels of cache memory (e.g., L2 106*b*, L3 106*c*, etc.) to be accessed by the processor 101.

Modern level languages (e.g., Java) may keep track of memory management, replacing the functionality of older programs that allocated and kept track of memory management. Because memory was not automatically managed by the processor, older programming paradigms that performed their own memory management suffered from memory leaks and other management problems. Modern programming languages now do this via a compiler and run-time methods. As memory-management becomes no longer relevant to what the application is doing, the modern language's run-time environment may free up memory as part of a process called garbage collection.

However, conventional garbage collection schemes may bring memory that may be necessary for ongoing processing into the cache along memory whose locations are being garbage collected (that is, the garbage will never be accessed again). In some aspects, it may be beneficial to differentiate the transiency of memory to determine if the data is never going to be accessed again. In some aspects, transient memory may not benefit the system if it is brought into cache, so there may be no real reason to drag data into cache for garbage collection. Bringing transient data into cache may unnecessarily pollute the cache, thereby slowing down the system. It is not advantageous to burden cache with unused memory.

The garbage-collection process generally involves two stages. First, a process may include identifying sections of memory that are eligible for garbage collection, and second, performing the actual garbage-collection restructuring of memory. If the memory locations being identified in the first stage of garbage collection (or other memory management algorithms configured for restructuring memory) could be tagged as transient, then it is possible that they may not need to be brought into the cache during the garbage-collection process, even if they are inadvertently referenced by the process. Accordingly, processor speed may be increased by minimizing nonproductive entries being placed in the cache. During this identification process, live processes running on the processor may still access memory locations loaded into cache. Therefore, even though identified as a potential transient access, it may not bypass the cache unless the process control indicated.

Current memory management schemes may not dynamically identify blocks of memory that are to be exempted from cache accesses in a virtual-memory environment. Moreover, conventional memory management systems may not determine when data access is transient in nature to avoid cache pollution, or exploit the identification of transiency of the blocks of memory to streamline memory access speed. Accordingly, it may be advantageous to provide systems and methods for identifying one or more blocks of memory that the processor may be exempt from cache memory accesses.

Figure 8:
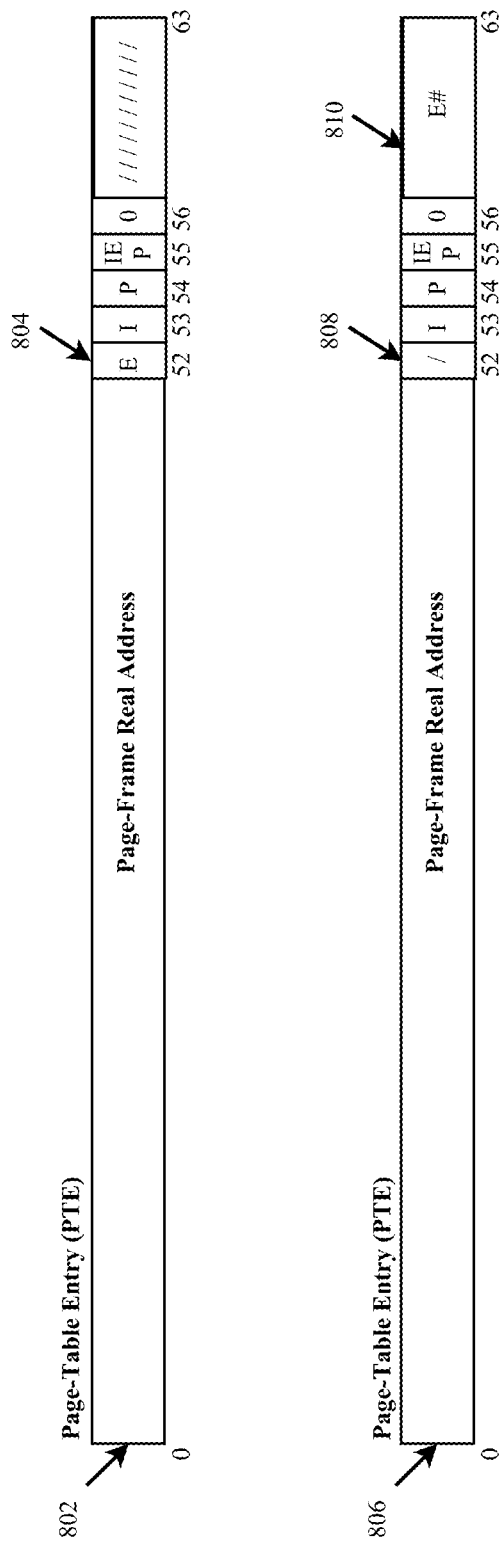
FIG. 8 depicts two examples of a page table entry having a memory exemption control, in accordance with an exemplary embodiment.

Referring now to FIG. 8, an exemplary page table entry 802 having a memory exemption control is depicted, in accordance with some embodiments. Page table entry 802 may include a memory exemption control 804 that may be indicative of whether processor 101 should exempt an individual virtual page from being eligible for caching. In some aspects, memory exemption control 804 may be configured within the table entry 802, which may be the final table (leaf) entry used in a successful virtual to real memory translation. In some embodiments, processor 101 may determine the cache exemption status of blocks of memory that may or may not be moved into cache memory, where the determination is based on the transiency of the blocks of memory. PTE 806 depicts memory exemption control 810 configured with a plurality of bits that may indicate more than one cache exemption statuses. Accordingly, exemption control bit 804 may not be used in PTE 806. In other embodiments such as the IBM enhanced-DAT facility 1, the exemption controls 804 and 810 may be in a segment-table entry which represents the final (leaf) table entry in the translation, or in the IBM enhanced-DAT facility 2, the exemption controls 804 and 810 may be in a region-$3^{rd}$-table entry which represents the final (leaf) table entry in the translation.

Figures 9, 10:
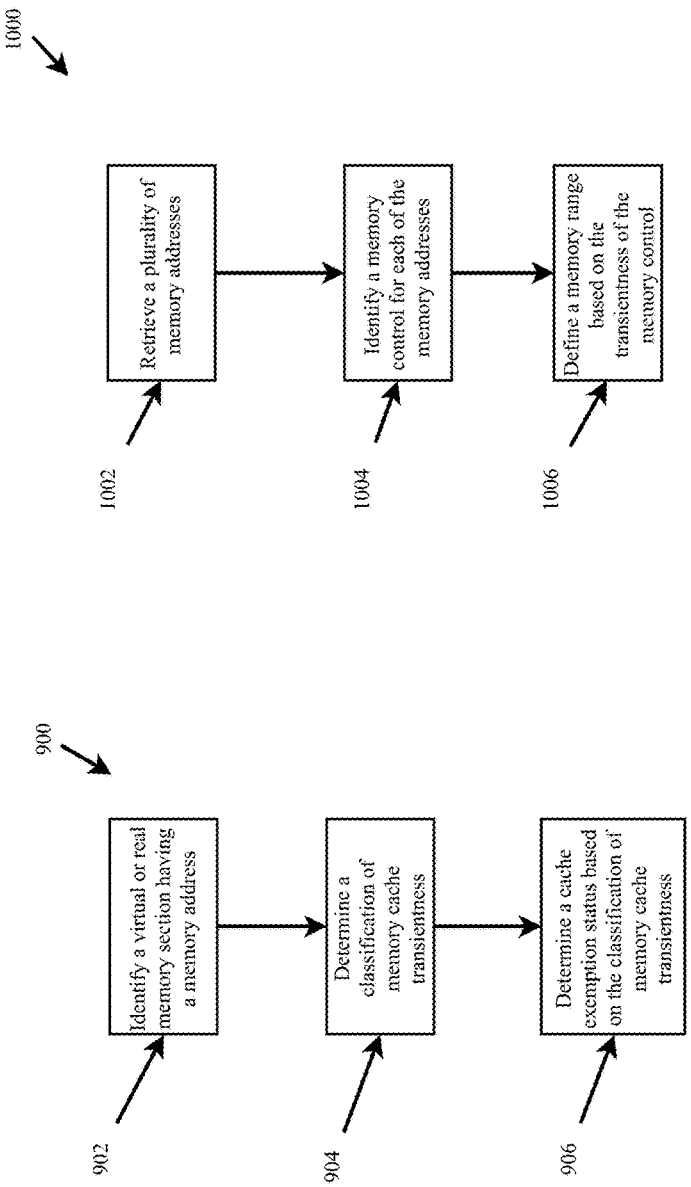
FIG. 9 depicts a flow diagram of a computer-implemented method for identification of cache memory transiency in accordance with an exemplary embodiment.
FIG. 10 depicts a flow diagram of a computer-implemented method for defining a transient-access memory range of a block of memory in accordance with an exemplary embodiment.

Referring now to FIG. 9, a flow diagram of a computer-implemented method 900 for identification of cache memory transiency is depicted, in accordance with some embodiments. In one embodiment, control information may indicate that an individual virtual page is exempted. The eligibility control may be kept within a "leaf" table entry, where a leaf can be indicative of whether the final table entry used in a successful translation.

As shown in block 902, processor 101 may identify a virtual memory address section having a virtual memory address. In some embodiments, processor 101 may parse the virtual memory address section to determine a classification of cache memory transiency, as shown at block 904. The cache memory transiency may be indicated by a memory exemption control 804. As shown in block 906, processor 101 may determine a cache exemption status based on the classification of cache memory transiency.

In some aspects, the cache exemption status may be indicative of whether the block of virtual memory should be saved into the cache memory. For example, if memory exemption control 804 is 1, processor 101 may classify the cache memory transiency as "transient." In other aspects, if memory exemption control 804 is valued at 0, processor 101 may classify the cache memory transiency as not transient.

In another embodiment, a control in a higher-level translation table (e.g., a table entry that is not a leaf table entry, which may also be referred to as a branch table entry) may provide an eligible-for-exemption indication for all leaf-table entries below it. For example, referring briefly again to FIG. 5, in some exemplary embodiments, an indication in RSTE 504 could apply to RTTE 506, STE 508, and PTE 510, which may be configured below the region-$2^{nd}$ table entry RSTE 504.

Referring again to FIG. 8, in some other aspects, the classification of cache memory transiency may further include values such as transient, not transient, somewhat transient, mostly transient, never transient, and so forth. In another embodiment, the control in the leaf-table entry may be a single yes/no eligibility indication, or it may be a numerical value indicating a level of eligibility (that is, some pages may be more important to be exempt from cache than others).

According to other embodiments, processor 101 may classify cache memory transiency based on other factors, such as, for example, whether the memory section comprises one or more memory pointers.

In some aspects, it may be advantageous to provide systems and methods for specifying ranges of addresses having a classification of cache memory "transiency." According to embodiments described herein, transiency may describe a propensity for a memory to include transiently accessed information. FIG. 10 depicts a flow diagram of a computer-implemented method 1000 for defining a transient-access memory range of a block of memory, in accordance with an exemplary embodiment.

Referring now to FIG. 10, in some embodiments, processor 101 may be configured to retrieve a plurality of memory addresses from a block of memory, as seen in block 1002.

As shown in block 1004, processor 101 may identify a memory control for each of the plurality of memory addresses. The memory control for each of the plurality of memory addresses may be indicative of a plurality of blocks that are eligible for exemption from caching.

Next, processor 101 may define a memory range based on the transiency of the memory control. In some aspects, processor 101 may define the memory range using a variety of techniques. For example, in some aspects, the memory control for each of the plurality of memory may include one or more sets of a starting address and a length of a block at that address of transient memory that is eligible for exemption from caching. FIGS. 18A-18D describe various ways that processor 101 may define blocks of memory eligible for cache exemption.

Referring briefly to FIG. 18A, according to one embodiment, processor 101 may set address pairs to identify the ranges of addresses that are eligible for cache exemption. For example, processor 101 may identify two addresses from the plurality of memory addresses are a pair of addresses, where the first address includes a starting address, and the other being an ending address.

According to another embodiment, as shown in FIG. 18B, processor 101 may set addresses and length pairs to identify blocks eligible for cache exemption. For example, the memory control for each of the plurality of memory addresses may be indicative of a range of memory addresses having a starting memory address and a length of a block relative to the starting memory address. In some aspects, the block may be indicative of transient memory addresses that are eligible for exemption from caching.

According to another embodiment, as shown in FIG. 18C, processor 101 may provide sets of addresses that either have a constant size or have an initial value indicative of the size of the block that is eligible for cache exemption. In some aspects, the length of each of the plurality of blocks may be the same as the remaining blocks in the plurality of blocks.

According to yet another embodiment, processor 101 may set a single address field designating a memory location, as shown in FIG. 18D. The single address field may include a plurality of sections including, for example, a size field indicative of the size of each section, and a plurality of mask bits indicative of whether a section within the designated block of memory is or is not eligible for cache exemption.

Referring now to FIG. 11, a flow diagram of a computer-implemented method 1100 for defining a transient-access memory range with a bit mask control is depicted, in accordance with some embodiments. As shown in block 1102, processor 101 may parse the bit mask field of the memory address to determine the memory control for each of the plurality of memory addresses is indicative of a plurality of blocks that are eligible for exemption from caching. Processor 101 may determine the memory control in various ways.

For example, according to one embodiment, processor 101 may determine exemption eligibility for the memory range based on a storage-protection key. In some aspects, a protection key may include information for each physical block of storage that may provide transiency of each respective block. In other aspects, the storage protection key may include information for a single block or more than one block that may be exempted.

In another embodiment, the bit-mask control may include a starting address and size attribute that is indicative of a broad range of memory addresses that are subject to exemption. In some aspects, the control may identify a plurality of bits in a mask field may identify which of the sub-blocks of this address range are eligible for exemption, as shown at block 1104. For example, if a block is at 12345000 having 256 bytes size for each section, then processor 101 may allocate a bitmask of 64 bits×256 bytes of data, with 4 k-bytes for each block, which may provide 64×4 k-bytes.

According to other embodiments, processor 101 may determine eligible sub-blocks via a single address field designating a memory location that includes a plurality of sections, as shown at block 1106. According to some embodiments, the address field may be indicative of a length of a block from the plurality of blocks that is eligible for exemption from caching. In some aspects, the block may have a length equal to at least one other block in the plurality of blocks, where the length is either constant or settable in a processor register. The single address field may be configured to indicate the size of each section, and a plurality of mask bits indicating whether a section within the designated block of memory is or is not eligible for cache exemption. Accordingly, as shown in block 1108, processor 101 may mark eligible sub-blocks based on the exemption status.

Once processor 101 has identified memory that is transient, by identifying either individual memory addresses or blocks of addresses, it may be advantageous to provide systems and methods for process-related control of processor state with respect to processor access of the identified transient memory. In some aspects, a controlling mechanism in the CPU could be extended to contain a control that gets matched up against the code in a page table entry. Accordingly, processor 101 can compare the controlling mechanism in the CPU with the code in the page table entry to determine the exemption eligibility of a particular page. FIG. 12 depicts a method 1200 for managing a processor state with transient cache memory, in accordance with some embodiments.

A program status word (PSW, which, among other controls, includes an instruction pointer) is a control mechanism in the processor by which the operating system can keep track of where a program is when it is interrupted; the PSW also contains various process-related controls such as interruption-enablement masks, memory-protection key, addressing mode (that is, 24-, 31-, or 64-bit), address-space controls, condition code, and so forth. In some aspects, processor 101 may save a program status word indicative of where it was when it is interrupted and other status, and record the processor state at that moment. Then if that particular task gets re-dispatched, then the operating system may reload that value based on the saved program status word. It may be advantageous to manage access to the transient cache memory for processing speed improvements using PSW controls or other processor control mechanisms. The PSW may be extended to include controls that are compared with, for example, the cache-exemption controls described in the page-table entries.

In some embodiments, the exemption controls may be in the dynamic-address-translation table entries used to translate the virtual address. According to other embodiments, identification of the exemption may be performed by a plurality of mechanisms described with respect to FIG. 18, regardless of whether the address is virtual or the address is real.

Referring now to FIG. 12, a flow diagram of a method 1200 for managing the processor state with the transient cache memory is depicted, according to some embodiments. As shown in block 1202, processor 101 may receive a memory access request as a result of program execution. According to some embodiments, the program status word may be configured to include the memory control information. Responsive to the memory access request, processor 101 may identify a memory section having a memory address, as shown in block 1204.

Processor 101 may parse the memory address to determine memory control information, as shown in block 1206. In one embodiment, the control may be implemented as a simple binary indication in the CPU's program-status word, or it may be implemented in other process controls that represent the context of the thread being executed (for example, a control register).

Finally, processor 101 may use the memory control information to control the processor state, as shown in block 1208. If the memory control is indicative of transient-access eligibility, then processor 101 may or may not cache the memory access according to information contained in the control.

Figure 13:
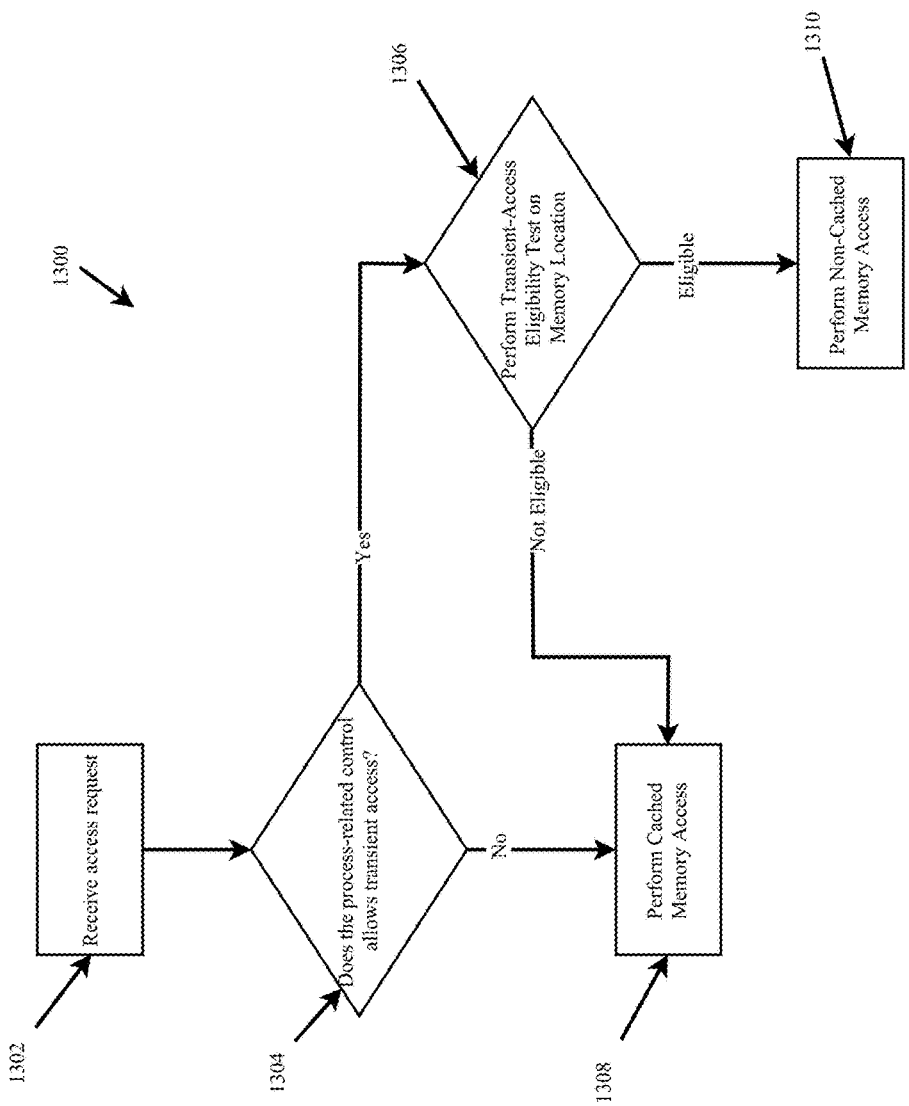
FIG. 13 depicts a flow diagram for a computer-implemented method for managing a processor state based on transient-access eligibility in accordance with some embodiments.

FIG. 13 is a flow diagram depicting a method 1300 for managing a processor state based on transient-access eligibility, in accordance with some embodiments. Referring now to FIG. 13, as shown at block 1302, processor 101 may receive an access request as a result of program execution. As shown in block 1304, processor 101 may determine, based on the access request, whether the process-related control allows transient access. The transient access may be based on an exemption status. For example, in some embodiments, the instruction thread may include a simple off-or-on bit (0 or 1), which may be indicative of honoring or excluding any other indication of exemption. According to some embodiments, if the exemption status value is 0, then nothing is exempted regardless of what the page table says, and everything is allocated to the cache memory. Accordingly, as shown in block 1308, processor 101 may perform the cached memory access. If processor 101 determines that the process-related control value is 1, then processor 101 may perform a transient-access eligibility test on the memory location, as shown in decision block 1306. If processor 101 determines that the memory location is eligible for access, processor 101 may perform the non-cached memory access, as shown at block 1310. If processor 101 determines that the location is not eligible, then processor 101 may perform the cached memory access (as shown in block 1308).

Access control may be further indicated in a separate table. In some aspects, processor 101 may control the access to the transient cache memory by accessing a table that matches the memory control information with a transient memory access policy. For example, memory 102 may include one or more tables having memory control information matched with a corresponding transient memory access policy.

According to other embodiments, instead of just one bit indicating the exemption control for a virtual address, a leaf-table entry (such as the page-table entry 802, or segment- or region-third-table entry) may include a process-related control 810 having a numeric value indicating a level of severity of the memory access (e.g., a level-of-caching-eligibility value or triage value). In some aspects, the numeric value may include a relative value that is greater than or less than a previous control in a leaf table entry. For example, the value may be indicated as greater than or less than the previous controls for the leaf table entry. In other aspects, the level of severity may be indicative of a relative numeric priority with respect to the other control leaf entry tables.

When processor 101 determines that the control is set to a non-default value, then memory locations that have been tagged with a higher severity may be subject to caching, but locations that are less than the process-related control value may not subject to caching. Accordingly, processor 101 may dictate the level of cache entry that is allowed to be made for the particular memory location.

According to other embodiments, the process-related control may be a numeric value that must match that of the tagged memory, where controlling the access to the transient cache memory comprises accessing a table that matches the memory control information with a transient memory access policy. In some aspects the memory control can include a binary bit having values indicative of a predetermined transient memory access policy stored in the table.

In some aspects, the process-related control may be configured as a bit mask where each bit position represents matching criteria for that of the tagged memory (similar to the PSW-key). This now allows processor 101 to permit or disallow transient recognition for a memory area using a address based on some sort of code included in the page table entry. This may permit or disallow memory address based on multiple codes. For example, processor 101 may allow data access responsive to codes having the values 0, 1, 5, and 15 (or some other codes indicated in the table). This bit match mechanism may provide the ability to match up against a plurality of bits instead of matching up against a single indicating bit.

In some conventional architectures, the PSW may include a key indicating that the CPU is executing in a specific key number (e.g., key 8), and may be permitted to access data corresponding to the bit position key representation in the PSW (e.g., corresponding to key 8). In some embodiments, instead of having a 4 bit numeric key value that only permits access to certain keys (e.g., 0-15, which are the full range of identifiable choices out of 4 bits), now processor 101 may interpret a 16 bit mask that can provide access to anything with protection key 0, protection key 4, 5, 9, etc., which may be based on whether those respective bits are on or off. Accordingly, processor 101 may identify a plurality of keys instead of only a single numeric value for it.

Managed Runtime Environments (MRTEs) often employ a "Garbage Collection" (GC) function to remove memory objects that are no longer in use from the software heap. The software that implements this garbage collection function typically has to access a large section, or perhaps all, of the heap to determine if an object is no longer referenced by any other object. In a typical computer system with hardware data caches, the garbage collection code may bring memory into the cache so that the CPU can test for usage of an object, and after it is done with that object, the data, now in the cache, may not be re-used for a long time. In other words, the data associated with the garbage collection function may have poor temporal and spatial locality of reference, which is what the hardware caches rely upon to achieve good performance. In fact, as the garbage collection code runs, it may displace existing data from the hardware caches that may be likely used again after the garbage collection function is complete.

In addition to the garbage collection function of MRTEs, certain other software may share this property of poor locality of reference where it also displaces other data in the hardware caches that will be reused in the near future. Accordingly, it may be advantageous to provide systems and methods having a mechanism that hardware can, after being informed by software of the transient nature of an access, provide access without polluting the lowest level cache(s) (e.g., the L1 data cache 106a) with transient data.

FIG. 14 depicts a flow diagram for a method 1400 for managing a cache memory using transiency classification, in accordance with some embodiments.

Referring now to FIG. 14, as shown in block 1402, processor 101 may fetch a data portion. As shown at block 1404, processor 101 may identify a transiency classification of the data portion in cache memory. When processor 101 fetches a cache line and determines a transiency classification indicative of transient data, the cache line data may only be brought into the L1 cache. As shown in block 1406, processor 101 may, optionally, update one or more TLBs with a TLB update.

As shown in block 1408, processor 101 may evaluate whether the data portion should be copied to at least one other cache memory of a plurality of cache memories based on the transiency classification of the data portion. Accordingly, other higher levels of cache (e.g., L2 106b and L3

106c) may only be updated to track the L1 for cache coherency purposes in their tag-only cache having only memory location pointers.

As shown in block 1410, processor 101 may selectively save the data portion to a potential one or more of the plurality of cache memories based on the transiency classification of the data portion. Processor 101 may selectively save the data portion, where selectively saving can include saving or not saving the data portion to any other cache memories of the plurality of cache memories. Accordingly, when the data eventually ages out of a higher level cache, processor 101 may still need to send a cross-interrogate (XI) to all lower levels of cache. In many cases, by this time it is very likely for the transient data to have already aged-out of these lower level caches. In some aspects there may be no performance penalty, and cache pollution due to these transient accesses is avoided.

When transient data associated with one of these instructions is fetched or stored from memory, processor 101 can treat this transient data differently from non-transient data. In most processor designs the transient data may still need to be brought into the lowest level L1-cache. In contrast, according to some embodiments, processor 101 may have determined that the data is transient, and thus, may not mark that cache line as MRU, but instead may explicitly make it "least-recently used" (LRU) in its tag structure. Therefore, processor 101 may be less likely to displace other data that is not transient and may be more likely to re-use that data after the garbage collection software has completed.

Furthermore, higher-level caches may also treat these transient accesses specially. Another aspect may apply to a cache hierarchy that requires a proper subset policy (i.e., all cache lines in lower level caches must also exist in higher level caches). If the coherency scheme does not require a subset policy, then processor 101 may omit installation of this transient data in the higher-level caches. Accordingly, processor 101 can effectively bypass the data to the lower level caches.

On higher level caches that do require full subset handling, two options exist: In a first approach, processor 101 may not install the transient data as MRU, or may explicitly make the data LRU in the cache tags. This approach may be similar to the behavior described above with respect to the L1 cache. When processor 101 chooses a replacement location for the transient data, the data may not be promoted to MRU status. In other implementations, the data may be explicitly made LRU. This can minimize the chance of displacing more important non-transient data.

In a second approach, processor 101 may create a "tag-only" structure in parallel to the higher-level cache. Accordingly, processor 101 may instantiate a secondary cache tag array that includes only memory tag information, where the memory tag is indicative of whether one or more of the plurality of cache memories includes a copy of the data portion. These tags, one (or more) per congruence class, may only be present to provide coherency in a proper subset design. They may not contain any data, but may simply indicate that a lower-level cache does indeed have (or may have) the data for that cache line and it would need to be invalidated on an LRU replacement from the tag-only structure or a cross-interrogate (XI) from another CPU. Since this tag-only structure may not contain any data, it may be physically much smaller than the real cache. Accordingly, the tag-only structure can avoid pollution of the higher-level cache, since the data in the higher-level cache may not be displaced by the transient data.

When this higher level cache, such as an L2 cache (e.g., L2 cache 106b), receives a request for transient data from the L1 cache 106a, it may first check to see if the data is present in its main L2 cache 106b. If it is, it may forward the data to the L1 cache 106a.

There are two possible implementations at this point: first, since processor 101 now knows the data is transient, it could remove the data and move the address information to the L2 tag-only cache directory. According to a second implementation, processor 101 may take no special action and leave the data in the main L2 cache 106b.

If processor 101 does not hit in the main L2 cache 106b, it may check the L2 tag-only cache. If it hits in the tag-only cache (e.g., a match is found), processor 101 does not have the data to supply to L1 cache 106a, so it needs to refetch it from a higher level cache or directly from main memory. If the request for transient data misses in the L2 tag-only cache, which is most likely, processor 101 may also need to fetch the data from a higher level cache or directly from main memory 102.

Accordingly, the request portion may be the same in either case. In both cases, if there is a higher level cache than L2 cache 106b, processor 101 may forward the request to the L3 along with information that this is a transient data request. When the data comes back from L3 cache 106c or main memory, processor 101 may forward the data to L2 cache 106b. In other aspects, L2 cache 106b may be bypassed. The data may not be written into the L2 data cache itself, but instead the address information is written into the L2 tag-only directory. If the address is already there, processor 101 may perform no additional action.

The same design, as described above with respect to L2 cache 106b, can be used for an L3 cache 106c, L4 cache (not shown), and so forth, with respect to handling transient data. Accordingly, there may be no need to actually install this transient data into any higher level cache, as long as the tag-only directory is updated to show ownership by a lower-level cache and to maintain cache coherency. Processor 101 may assign a memory tag that includes memory tag information to that cache level, where the memory tag information comprises memory address information, cache level information and the transiency classification. If an XI request is received for an address held in a tag-only directory, processor 101 may forward that cache level XI to lower level caches and delete the address from its tag-only directory.

A translation lookaside buffer (TLB) contains mappings of virtual to real addresses that have been previously translated. This translation, at times, may be a relatively slow process using up to 5 levels of tables. When the CPU misses in the TLB for a translation where the virtual address is known to be for transient data, processor 101 may translate the virtual address to a real address in the normal manner. However, according to some embodiments, processor 101 may not install this new entry in the TLB in the normal way in order to protect the TLB from being polluted by these transient entries. FIG. 15 depicts a computer-implemented method for protecting a translation lookaside buffer (TLB), in accordance with some embodiments.

Referring now to FIG. 15, a flow diagram for a method 1500 for protecting a translation lookaside buffer from pollution is depicted, in accordance with some embodiments. In some aspects, processor 101 may first receive a virtual address from the software program, as shown in block 1502. FIG. 16A depicts processor 101 having cache 106, which may include a plurality of cache buffers 106a-106n. Processor 101 may further include a first translation lookaside buffer (TLB) 1602A. First TLB 1602A may include a plurality of congruence classes (not shown) corresponding with each of caches 106*a*-106*n*. According to other embodiments, as shown in FIG. 16B, processor 101 may include a second TLB 1604B that may receive the transient entries.

Referring again to FIG. 15, according to some embodiments, after receiving the virtual address from the program 111, processor 101 may determine whether the virtual address has a classification of cache memory transiency, as shown in block 1504.

According to some embodiments, processor 101 may install a new TLB entry into the appropriate congruence class in first TLB 1602, as shown in block 1506. In some aspects, processor 101 may not set the LRU tags to make the entry MRU, as would be the case normally. Instead, according to some embodiments, processor 101 may receive the virtual address, and determine whether the virtual address has a classification of cache memory transiency.

As shown in block 1508, processor 101 may pick the LRU location for an entry for replacement for that congruence class based on the classification of cache memory transiency, and install an entry there. In some aspects, processor 101 may effectively make this entry the first entry to age out of that congruence class on the subsequent installation of another entry (either for transient data or for normal data). If the amount of simultaneously accessed transient data is large enough, processor 101 may install new transient entry in first TLB 1602A, in the LRU+1 position (internal registry positions not shown). Accordingly, processor 101 may allow two transient entries to share the same congruence class.

Figure 17:
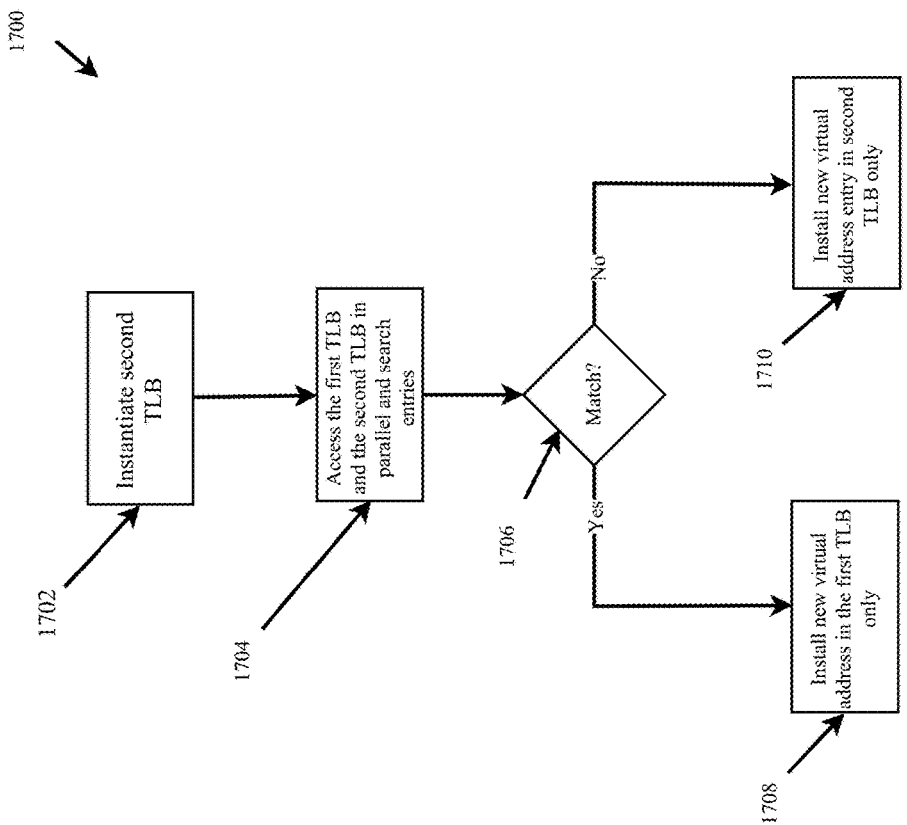
FIG. 17 depicts a flow diagram of a computer-implemented method for installing a translation lookaside buffer (TLB) entry in a next available least-recently-used (LRU) position in accordance with some embodiments.

In other embodiments, it may be beneficial for processor 101 to access a smaller side TLB 1604A in parallel to the main TLB (first TLB 1602A). FIG. 17 depicts a flow diagram for a method 1700 of installing a TLB entry in a next available LRU position, in accordance with some embodiments.

Referring now to FIG. 17, as shown in block 1702, processor 101 may instantiate a side TLB 1604A, where side TLB 1604A can be accessed by processor 101 in parallel with first TLB 1602A (as shown in block, 1704). Depending on whether a match is detected (as shown in block 1706), processor 101 may be further configured to install a new address entry having a classification of cache memory transiency in side TLB 1604A.

Depending on the application, this side-TLB might be 4 to 16 entries accessed in a direct-mapped or fully associative manner. According to some embodiments, as shown in block 1704 when processor 101 looks up an address, processor 101 may access both the main TLB (e.g., first TLB 1602A) and the side-TLB (e.g., side TLB 1604A) in parallel to determine if the target data portion exists in either TLB record (shown in decision block 1706). In some aspects, processor 101 may keep the entries in only one of the main TLB or side-TLB, but not both. If processor requests access for transient data and it misses in both TLBs, as shown in block 1710, after virtual-to-real address translation, processor 101 may install the entry in the side TLB 1604A only. In this respect, processor 101 may not update first TLB 1602A, including its LRU tags. Therefore, the first TLB 1602A is not polluted with these transient translations, which are kept solely in the side TLB.

In some embodiments, the CPU implementation may include multiple levels of TLBs. For example, processor 101 may instantiate a low-level TLB1 and a higher level TLB2. Accordingly, there may be two possible implementations to exploit the knowledge of transient data. According to one embodiment, processor 101 may never install the transient entry in second TLB 1604B (which may be configured as the higher level TLB). In some aspects, this may include instances in which the initial virtual-to-real address translation is done on the transient access, or if second TLB 1604B is a victim-TLB.

According to some embodiments, a victim TLB is a TLB used to hold blocks evicted from a CPU cache upon replacement. The victim TLB lies between the main cache and its refill path, and only holds blocks that were evicted from the main TLB. The victim TLB is usually fully associative, and is intended to reduce the number of conflict misses. Many commonly used programs do not require an associative mapping for all the accesses. In fact, only a small fraction of the memory accesses of the program require high associativity. The victim TLB may exploit this property by providing high associativity to only these accesses. Accordingly, processor 101 may not install it after the transient entry ages out of first TLB 1602B.

In other embodiments, processor 101 may install the transient entry it in the second TLB 1604B (or higher level TLB), but may not update the LRU tags so that it is the first entry from that congruence class to age out and be replaced. It should be noted that if processor 101 has a TLB for data operand accesses, and a separate TLB for instruction accesses, this scheme only applies to the TLB for data operand accesses. Accordingly, the instruction TLB may not contain transient instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for identification of cache memory transiency comprising:
    identifying, with a processor, a virtual memory address section having a virtual memory address, wherein the virtual memory address comprises a plurality of region index fields and a byte index;
    determining, via the processor, a classification of cache memory transiency of the virtual memory address section;
    wherein the classification of cache memory transiency comprises one of a group of values comprising transient, not transient, somewhat transient, mostly transient, and never transient; and
    wherein the classification of the cache memory transiency is indicative of a level of eligibility for cache exemption that is greater than or less than another control in a leaf table entry and is indicated as greater than or less than previous controls for the leaf table entry, and wherein a data portion having a greater value relative to another control is subject to caching, and a control having a smaller value relative to another control is not subject to caching; and
    determining, with the processor, based on the classification of cache memory transiency, a cache exemption status.

2. The computer-implemented method of claim 1, wherein the classification of the cache memory transiency is determined based on whether the memory section comprises one or more memory pointers.

3. The computer-implemented method of claim 1, wherein the cache exemption status is indicative of whether a block of virtual memory should be placed into the cache memory.

4. The computer-implemented method of claim 1, wherein the virtual memory address section comprises one or more of page information, region information and segment information.

5. The computer-implemented method of claim 1, wherein the classification of the cache memory transiency is indicative of one or more memory allocation actions based on a relative numeric priority compared to another table entry of a plurality of table entries.

6. A system for identification of cache memory transiency comprising a cache memory and a processor having access to the cache memory and configured to:
   identify a virtual memory address section of the cache memory having a virtual memory address, wherein the virtual memory address comprises a plurality of region index fields and a byte index;
   determine a classification of cache memory transiency of the virtual memory address section;
   wherein the classification of cache memory transiency comprises one of a group of values comprising transient, not transient, somewhat transient, mostly transient, and never transient
   wherein the classification of the cache memory transiency is indicative of a level of eligibility for cache exemption that is greater than or less than another control in a leaf table entry and is indicated as greater than or less than previous controls for the leaf table entry, and wherein a data portion having a greater value relative to another control is subject to caching, and a control having a smaller value relative to another control is not subject to caching; and
   determine, based on the classification of cache memory transiency, a cache exemption status.

7. The system of claim 6, wherein the cache exemption status is indicative of whether a block of virtual memory should be saved into the cache memory.

8. The system of claim 6, wherein the classification of the cache memory transiency is indicative of whether the address is a memory location pointer.

9. The system of claim 6, wherein the virtual memory address section comprises one or more of page information, region information and segment information.

10. A non-transitory computer-readable storage medium having program instructions embodied therewith, the program instructions executable by a processor to cause the processor to perform a method for identification of cache memory transiency, the method comprising:
    identifying, with a processor, a virtual memory address section having a virtual memory address, wherein the virtual memory address comprises a plurality of region index fields and a byte index;
    determining a classification of cache memory transiency of the virtual memory address section;
    wherein the classification of cache memory transiency comprises one of a group of values comprising transient, not transient, somewhat transient, mostly transient, and never transient; and
    wherein the classification of the cache memory transiency is indicative of a level of eligibility for cache exemption that is greater than or less than another control in a leaf table entry and is indicated as greater than or less than previous controls for the leaf table entry, and wherein a data portion having a greater value relative to another control is subject to caching, and a control having a smaller value relative to another control is not subject to caching; and
    determining, with the processor, based on the classification of cache memory transiency, a cache exemption status.

11. The non-transitory computer-readable storage medium of claim 10, wherein the classification of the cache memory transiency is determined based on whether the memory section comprises one or more memory pointers.

12. The non-transitory computer-readable storage medium of claim 10, wherein the cache exemption status is indicative of whether a block of virtual memory should be placed into the cache memory.

13. The non-transitory computer-readable storage medium of claim 10, wherein the virtual memory address section comprises one or more of page information, region information and segment information.

* * * * *